(12) United States Patent
Jeong et al.

(10) Patent No.: US 10,910,624 B2
(45) Date of Patent: Feb. 2, 2021

(54) BATTERY PACK INCLUDING ELECTRODE TERMINAL HAVING CATCH JAWS

(71) Applicant: Samsung SDI Co., Ltd., Yongin-si (KR)

(72) Inventors: Ikjae Jeong, Yongin-si (KR); Mincheol Bae, Yongin-si (KR); Hongkeun Choi, Yongin-si (KR); Jiho Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 381 days.

(21) Appl. No.: 15/257,775

(22) Filed: Sep. 6, 2016

(65) Prior Publication Data
US 2017/0069903 A1 Mar. 9, 2017

(30) Foreign Application Priority Data

Sep. 3, 2015 (KR) .......................... 10-2015-0124933

(51) Int. Cl.
*H01M 2/30* (2006.01)
*H01M 2/20* (2006.01)
*H01M 10/6555* (2014.01)
*H01M 2/34* (2006.01)
*H01M 10/613* (2014.01)

(52) U.S. Cl.
CPC .............. *H01M 2/30* (2013.01); *H01M 2/202* (2013.01); *H01M 2/345* (2013.01); *H01M 10/613* (2015.04); *H01M 10/6555* (2015.04); *H01M 2200/20* (2013.01)

(58) Field of Classification Search
None
See application file for complete search history.

(56) References Cited

U.S. PATENT DOCUMENTS

| | | | |
|---|---|---|---|
| 8,038,487 B2 * | 10/2011 | Tsuchiya | ............... H01M 2/202 429/160 |
| 8,480,763 B2 | 7/2013 | Nansaka et al. | |
| 8,790,821 B2 | 7/2014 | Ito et al. | |
| 2012/1214053 | 8/2012 | Kim | |
| 2013/0330602 A1 * | 12/2013 | Tsutsumi | ............... H01G 11/70 429/179 |

FOREIGN PATENT DOCUMENTS

| | | |
|---|---|---|
| JP | 2010-212034 A | 9/2010 |
| KR | 10-2011-0126538 A | 11/2011 |
| KR | 10-2012-0095290 A | 8/2012 |
| WO | WO 2010/134155 A1 | 11/2010 |

* cited by examiner

*Primary Examiner* — Zhongqing Wei
(74) *Attorney, Agent, or Firm* — Knobbe, Martens, Olson & Bear, LLP

(57) ABSTRACT

A battery pack is disclosed. In one aspect, the battery pack includes a battery cell and an electrode terminal including a plate member electrically connected to the battery cell, and a bolt passing through the plate member. The bolt includes a plurality of catch jaws disposed on opposing sides of the plate member in a length direction of the bolt and a thread portion exposed from the plate member. The plate member and the bolt include different metallic materials.

21 Claims, 6 Drawing Sheets

BATTERY PACK INCLUDING ELECTRODE TERMINAL HAVING CATCH JAWS

CROSS-REFERENCE TO RELATED APPLICATION

This application claims the benefit of Korean Patent Application No. 10-2015-0124933, filed on Sep. 3, 2015, in the Korean Intellectual Property Office, the disclosure of which is incorporated herein in its entirety by reference.

BACKGROUND

Field

The described technology generally relates to a battery pack.

Description of the Related Technology

Unlike primary batteries, secondary batteries are rechargeable. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) including multiple electronically connected cells are used according to device power requirement.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs can be increased by changing the number of battery cells included in the battery packs.

SUMMARY OF CERTAIN INVENTIVE ASPECTS

Another aspect is a battery pack including an electrode terminal having an improved structure for forming a charge-discharge current path and providing an access point to the charge-discharge current path.

Another aspect is a battery pack that includes: a battery cell; and an electrode terminal including a plate member electrically connected to the battery cell, and a bolt inserted through the plate member, wherein the bolt includes: catch jaws disposed on both sides of the plate member in a length direction of the bolt; and a thread portion exposed from the plate member, wherein the plate member and the bolt include different metallic materials.

For example, the bolt may include a head and a deformed portion that respectively form the catch jaws on both sides of the plate member.

For example, the thread portion and the head of the bolt may be disposed on an end portion and the other end portion of the bolt, and the deformed portion may be disposed between the thread portion and the head and may be exposed from the plate member together with the thread portion.

For example, the plate member may include: a penetration hole through which the thread portion is inserted; and a recess having an inner circumferential surface larger than the penetration hole and receiving an outer circumferential surface of the head.

For example, the inner circumferential surface of the recess and the outer circumferential surface may physically interfere with each other at least partially.

For example, the inner circumferential surface of the recess and the outer circumferential surface may have a polygonal shape.

For example, the recess and the plate member disposed between the catch jaws may satisfy $C \leq t2$, where C represents a dimensional tolerance of the plate member and $t2$ represents a depth of the recess.

For example, the head, the recess, and the plate member disposed between the catch jaws may satisfy $C + t1 \leq t2$, where C represents a dimensional tolerance of the plate member, $t1$ represents a thickness of the head, and $t2$ represents a depth of the recess.

For example, the dimensional tolerance C, the thickness $t1$ of the head, and the depth $t2$ of the recess may be measured in the length direction of the bolt.

For example, the deformed portion may be a protrusion which is formed as the metallic material of the bolt is pushed from the thread portion toward the plate member when the thread portion is formed.

For example, the deformed portion may be disposed between the plate member and a turn of a thread of the thread portion closest to the plate member.

For example, the thread portion may not be formed in a region of the bolt covered with the plate member.

For example, the deformed portion may have a protrusion shape having a peak relatively distant from the plate member and relatively close to the thread portion.

For example, the metallic material of the bolt may have a higher degree of stiffness than the metallic material of the plate member.

For example, the plate member may include aluminum, and the bolt may include steel, copper, nickel, stainless steel (SUS), or an alloy thereof.

For example, assembling protrusions and assembling recesses may be respectively formed on mutually-facing surfaces of the plate member and the battery cell.

Another aspect is a battery pack comprising: a battery cell; and an electrode terminal comprising a plate member electrically connected to the battery cell, and a bolt passing through the plate member, wherein the bolt comprises: a plurality of catch jaws disposed on opposing sides of the plate member in a length direction of the bolt; and a thread portion exposed from the plate member, wherein the plate member and the bolt comprise different metallic materials.

In the above battery pack, the bolt comprises a head and a body extending from the head and having a deformed portion that is deformed with respect to the remaining portion of the body, and wherein the head and the deformed portion of the body respectively form the catch jaws on the opposing sides of the plate member. In the above battery pack, the thread portion is disposed in a portion of the body other than the deformed portion, and wherein the deformed portion is disposed between the thread portion and the head and is exposed from the plate member together with the thread portion. In the above battery pack, the plate member has: a penetration hole through which the thread portion is inserted; and a recess having an inner circumferential surface larger than the penetration hole and receiving an outer circumferential surface of the head.

In the above battery pack, the inner circumferential surface of the recess and the outer circumferential surface physically interfere with each other at least partially. In the above battery pack, the inner circumferential surface of the recess and the outer circumferential surface have a polygonal shape. In the above battery pack, the recess and the plate member disposed between the catch jaws satisfy $C \leq t2$, where C represents a dimensional tolerance of the plate member and t2 represents the depth of the recess. In the above battery pack, the head, the recess, and the plate member disposed between the catch jaws satisfy C+t1≤t2, where C represents a dimensional tolerance of the plate member, t1 represents the thickness of the head, and t2 represents the depth of the recess.

In the above battery pack, the dimensional tolerance C, the thickness t1 of the head, and the depth t2 of the recess are defined in the length direction of the bolt. In the above battery pack, the deformed portion includes a protrusion which is formed as the metallic material of the bolt. In the above battery pack, the deformed portion is disposed between the plate member and a turn of a thread of the thread portion closest to the plate member. In the above battery pack, the thread portion is not formed in a region of the bolt covered with the plate member. In the above battery pack, the deformed portion has a protrusion shape having a peak relatively distant from the plate member and relatively close to the thread portion.

In the above battery pack, the metallic material of the bolt is harder than the metallic material of the plate member. In the above battery pack, the plate member comprises aluminum, and wherein the bolt comprises steel, copper, nickel, stainless steel (SUS), or an alloy thereof. In the above battery pack, assembling protrusions and assembling recesses are respectively formed on mutually-facing surfaces of the plate member and the battery cell.

Another aspect is a battery pack comprising: a battery cell; and an electrode terminal comprising i) a base plate electrically connected to the battery cell having a first through-hole and a second through-hole smaller than the first through-hole and ii) a screw at least partially passing through the first and second through-holes of the base plate, wherein the screw comprises a head and a body, wherein the body includes a deformed portion deformed with respect to the remaining portion the body, wherein the head of the screw is inserted into the first through-hole of the base plate, wherein the deformed portion of the screw is inserted into the second through-hole of the base plate, and wherein the remaining portion of the body passes through the first and second through-holes and are exposed from the first and second through-holes of the base plate.

In the above battery pack, the deformed portion has a diameter larger than that of the second through-hole of the base plate and smaller than that of the first through-hole of the base plate, and wherein at least part of the deformed portion contacts an inner wall of the second through-hole of the base plate. In the above battery pack, the base plate and the screw are formed of different metallic materials. In the above battery pack, the head and the deformed portion of the screw provide a sufficient friction between the screw and the base plate so as to minimize or prevent rotation of the screw relative to the base plate.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
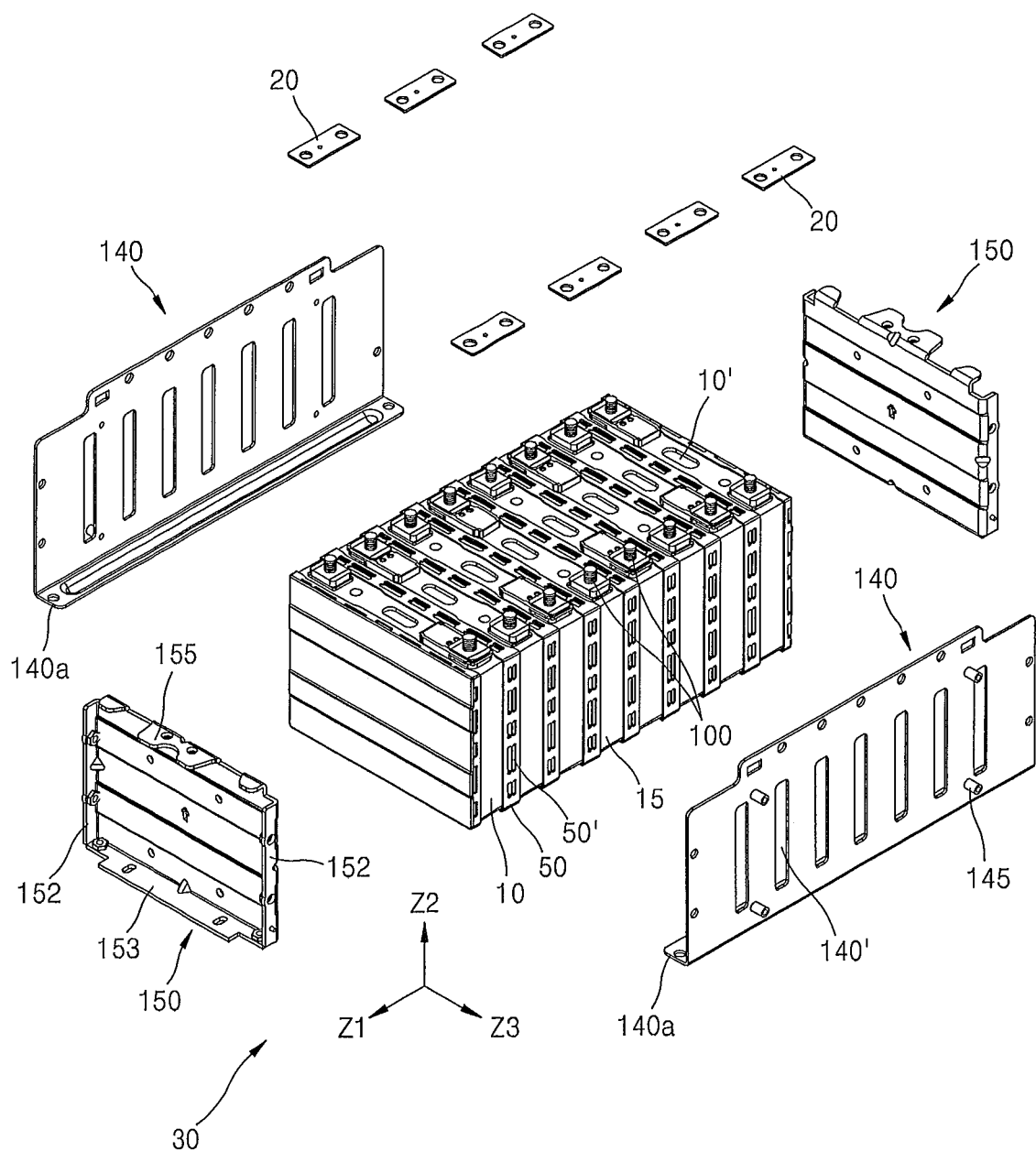
FIG. 1 is an exploded perspective view illustrating a battery pack according to an exemplary embodiment.

Embodiments will be described with reference to the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

A battery pack will now be described with reference to the accompanying drawings, in which exemplary embodiments are shown.

Figure 2:
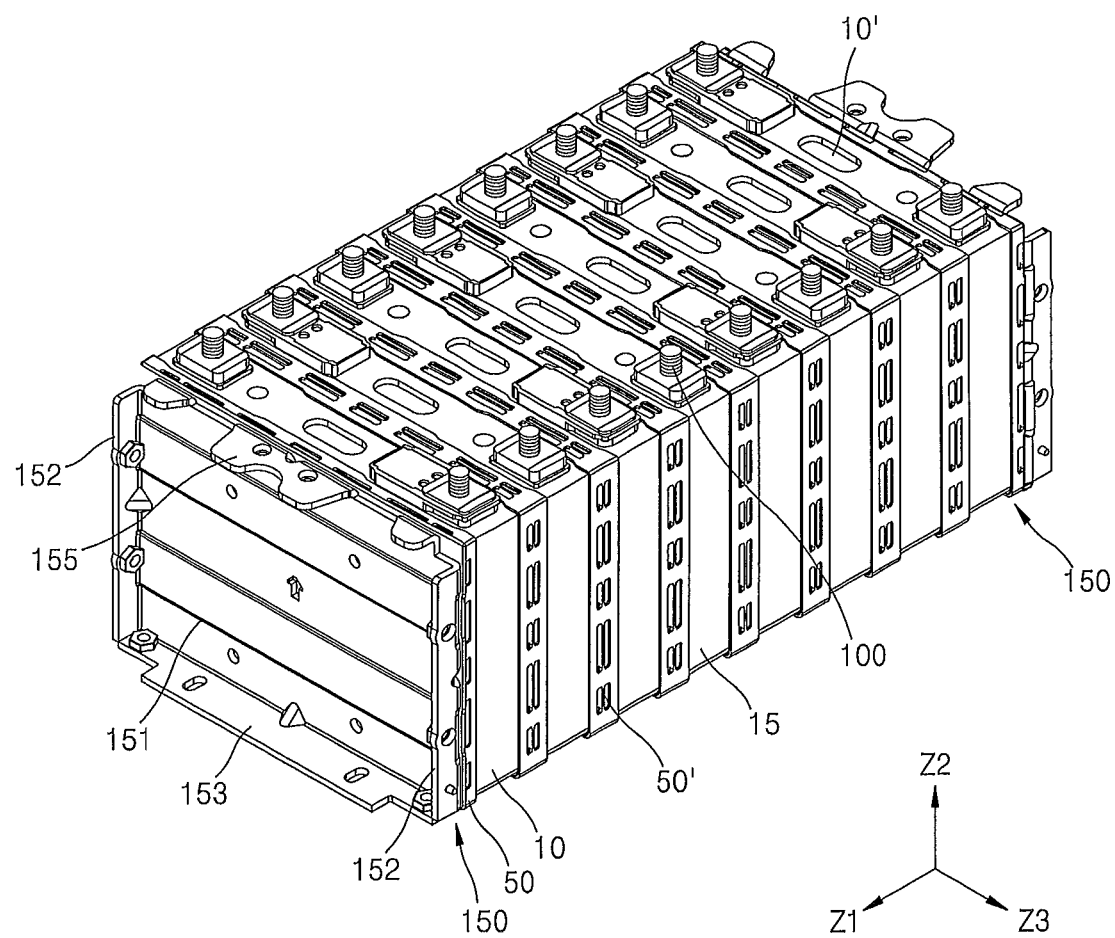
FIG. 2 is a perspective view illustrating parts of the secondary battery illustrated in FIG. 1.

FIG. 1 is an exploded perspective view illustrating a battery pack 30 according to an exemplary embodiment. FIG. 2 is a perspective view illustrating parts of the secondary battery illustrated in FIG. 1.

Referring to FIGS. 1 and 2, the battery pack 30 includes a plurality of battery cells 10 arranged in an arrangement direction Z1, and side and end plates 140 and 150 together surrounding the battery cells 10.

The battery cells 10 may be secondary battery cells such as lithium ion battery cells. The battery cells 10 may have any shape such as a cylindrical shape, a prismatic shape or other polygonal shapes. In addition, the battery cells 10 may be any type of battery cells such as polymer battery cells. That is, the battery cells 10 are not limited to a particular shape or type.

For example, each of the battery cells 10 may include a case 15 accommodating an electrode assembly (not shown) therein, and electrode terminals 100 electrically connected to the electrode assembly and exposed to the outside of the case 15. For example, the electrode terminals 100 may be exposed to the outside of the case 15 and may form a portion of an upper side of the case 15. The electrode terminals 100 can be electrically connected to an external circuit. Although not shown, the electrode assembly may include a positive electrode, a separator, and a negative electrode. The electrode assembly may be a jelly-roll or stacked type electrode assembly.

For example, the battery cells 10 neighboring each other may be electrically connected to each other through the electrode terminals 100 of the battery cells 10. In some embodiments, the battery cells 10 are electrically connected in series or parallel to each other by connecting the electrode terminals 100 of the battery cells 10 to one another using bus bars 20.

A safety vent 10' may be formed in the case 15. The safety vent 10' has a relatively weak resistance so that, if inner pressure in the case 15 increases to a critical value or higher, the safety vent 10' may break so that a gas may be released from the inside of the case 15 to the environment.

Spacers 50 may be disposed between the battery cells 10 neighboring each other. The spacers 50 may insulate the battery cells 10 from each other. For example, the cases 15 of the battery cells 15 have an electric polarity, and the spacers 50 including an insulation material and disposed between the cases 115 can avoid or minimize electric interference between the battery cells 10.

In addition, the spacers 50 may function as heat-dissipating paths between the battery cells 10. A plurality of heat-dissipating holes 50' may be formed in the spacers 50. As described later, heat-dissipating holes 140' may be formed in the side plates 140, which cover lateral sides of the spacers 50. The heat-dissipating holes 50' of the spacers 50 formed at positions facing the heat-dissipating holes 140' of the side plates 140 may be aligned with the heat-dissipating holes 140' of the side plates 140 to form heat-dissipating paths between the battery cells 10.

The spacers 50 may be disposed between the battery cells 10 and may suppress thermal expansion (swelling) of the battery cells 10. The cases 15 of the battery cells 10 include a deformable material such as metal. Thus, the spacers 50 may include a less deformable material than the cases 15 such as polymer to suppress swelling of the battery cells 10.

The spacers 50 may be disposed on the outermost sides of the battery cells 10 in the arrangement direction Z1 as well as between the battery cells 10. For example, as shown in FIG. 1, the end plates 150 are disposed on both ends of the battery cells 10 in the arrangement direction Z1, and spacers 50 are disposed between the end plates 150 and the outermost battery cells 10.

The end plates 150 are provided as a pair on both ends of the battery cells 10 in the arrangement direction Z1 of the battery cells 10. Sides of the end plates 150 may face the outermost sides of the battery cells 10. For example, the sides of the end plates 150 face the spacers 50 disposed on the outermost sides of the battery cells 10.

The end plates 150 combine the battery cells 10 as a unit. During charging and discharging of the battery cells 10, the end plates 150 suppress expansion of the battery cells 10 and maintain resistance characteristics of the battery cells 10, and thus electric characteristics of the battery cells 10 may not deteriorate.

Each of the end plates 150 may include a base plate 151, and flanges 152, 153, and 155 bent from the base plate 151 in a direction away from the battery cells 10. The base plate 151 may have a sufficient area to cover a corresponding side of the battery cells 10.

The flanges 152, 153, and 155 are bent from edges of the base plate 151 in a direction away from the battery cells 10. The flanges 152, 153, and 155 may include a pair of lateral flanges 152 formed on both lateral sides of the base plate 151, and upper and lower flanges 155 and 153 formed on upper and lower sides of the base plate 151.

Referring to FIG. 1, the flanges 152, 153, and 155 of the end plates 150 may provide coupling positions at which neighboring elements are coupled to the end plates 150. For example, the side plates 140 are coupled to edge portions of the end plates 150 through the flanges 152, 153, and 155 of the end plates 150. In addition, the flanges 152, 153, and 155 may enhance the mechanical stiffness of the end plates 150.

The lateral flanges 152 of the end plates 150 may provide coupling positions at which the side plates 140 are coupled to the end plates 150. For example, the side plates 140 are coupled to the end plates 150 by placing end portions of the side plates 140 on the lateral flanges 152 and fastening the end portions of the side plates 140 to the lateral flanges 152 using a fastener such as screws. For this, a plurality of coupling holes may be formed in the lateral flanges 152.

The side plates 140 may be disposed on both lateral sides of the battery cells 10. For example, the side plates 140 cover both lateral sides of the battery cells 10 arranged in the arrangement direction Z1. The side plates 140 may be provided as a pair on opposite lateral sides of the battery cells 10. The side plates 140 may extend in the arrangement direction Z1 of the battery cells 10. Ends of the side plates 140 may be coupled to the end plates 150 disposed on opposite ends of the battery cells 10. The side plates 140 may be coupled to the lateral flanges 152 formed on lateral edges of the end plates 150 by placing the lateral flanges 152 on the side plates 140, aligning the coupling holes of the lateral flanges 152 with coupling holes of the side plates 140, and fastening the lateral flanges 152 and the side plates 140 using fasteners such as bolts and nuts. In this case, at least portions of the side plates 140 and the lateral flanges 152 may be in surface contact with each other.

The side plates 140 may have a plate shape. The side plates 140 may include catch jaws 140a to support portions of the bottom sides of the battery cells 10. The side plates 140 may be disposed on the opposite lateral sides of the battery cells 10, and the catch jaws 140a may be bent from the side plates 140 to face each other and support the bottom sides of the battery cells 10.

The catch jaws 140a may extend along the entire lengths of the side plates 140 in the arrangement direction Z1 of the battery cells 10, and end portions of the catch jaws 140a may be coupled to the lower flanges 153 of the end plates 150 using screws. In some embodiments, coupling holes are formed in the catch jaws 140a and the lower flanges 153. For example, the side plates 140 and the end plates 150 are coupled by aligning the coupling holes of the catch jaws 140a and the lower flanges 153, inserting fasteners into the coupling holes, and tightening the fasteners. The catch jaws 140a and the lower flanges 153 may make surface contact with each other at corners of the battery pack. In this way, the side plates 140 may be fastened to the lower flanges 153 and the lateral flanges 152 of the end plates 150 to form an accommodation space for receiving the battery cells 10.

The heat-dissipating holes 140' may be formed in the side plates 140. For example, the heat-dissipating holes 140' are formed at regular intervals in the arrangement direction Z1 of the battery cells 10. Air may flow to the battery cells 10 through the heat-dissipating holes 140', and thus heat may be rapidly dissipated from the battery cells 10 when the battery cells 10 operate.

The bottom sides of the battery cells 10 may be exposed except for the portions supported by the catch jaws 140a of the side plates 140, and thus air may flow between the battery cells 10 through the bottom sides of the battery cells 10 to cool the battery cells 10.

Boss members or bosses 145 may be formed on the side plates 140 to attach a circuit board (not shown) to the boss members 145. The circuit board may include a battery management system (BMS) board. For example, sides of the side plates 140 face the battery cells 10, and circuit boards are attached to the other sides of the side plates 140. The circuit boards may monitor and control charging and discharging of the battery cells 10.

In some embodiments, the boss members 145 are disposed at four positions corresponding to the rectangular or square shape of a circuit board. The number of the boss members 145 may be multiples of four, and a plurality of circuit boards may be attached to the boss members 145. The circuit boards may have coupling holes (not shown), and screws may be inserted into the coupling holes of the circuit boards and the boss members 145 of the side plates 140 to fix the circuit boards to the side plates 140.

An inner cover (not shown) may be disposed on the upper sides of the battery cells 10. Substantially, the inner cover may entirely cover the battery pack. For example, the inner cover may cover all the battery cells 10 of the battery pack.

Hereinafter, structures of the electrode terminals 100 will be described.

Figure 3:
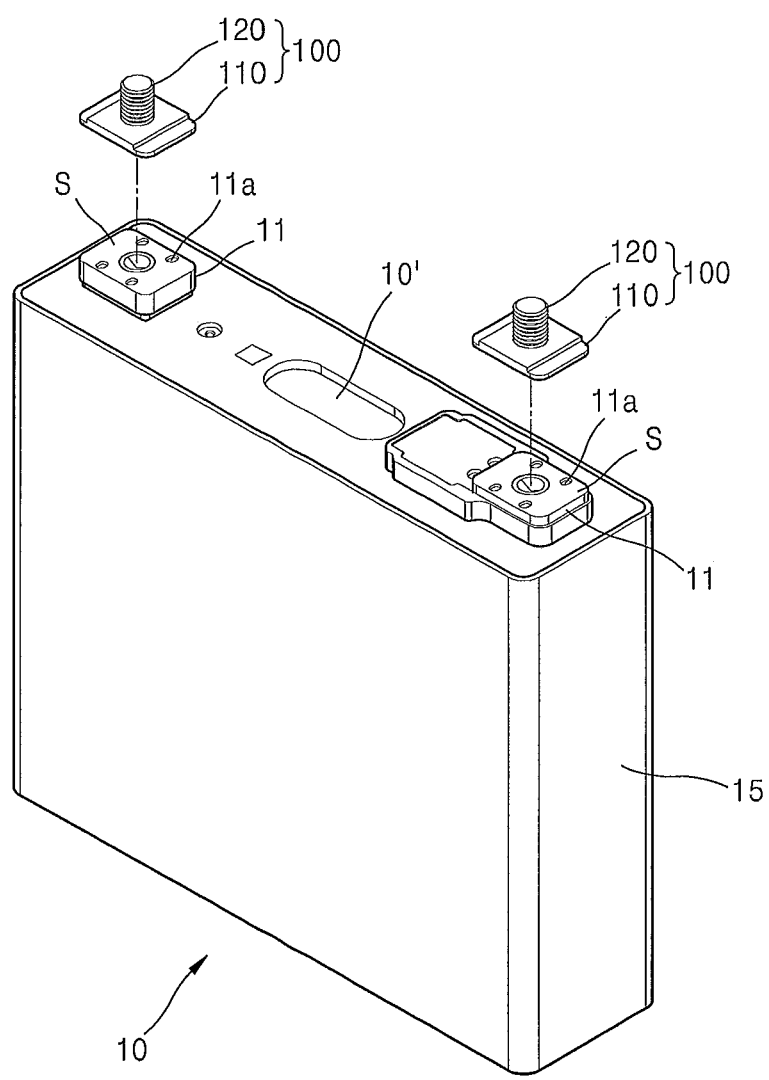
FIG. 3 is an exploded perspective view illustrating a battery cell according to an exemplary embodiment.
Figure 4:
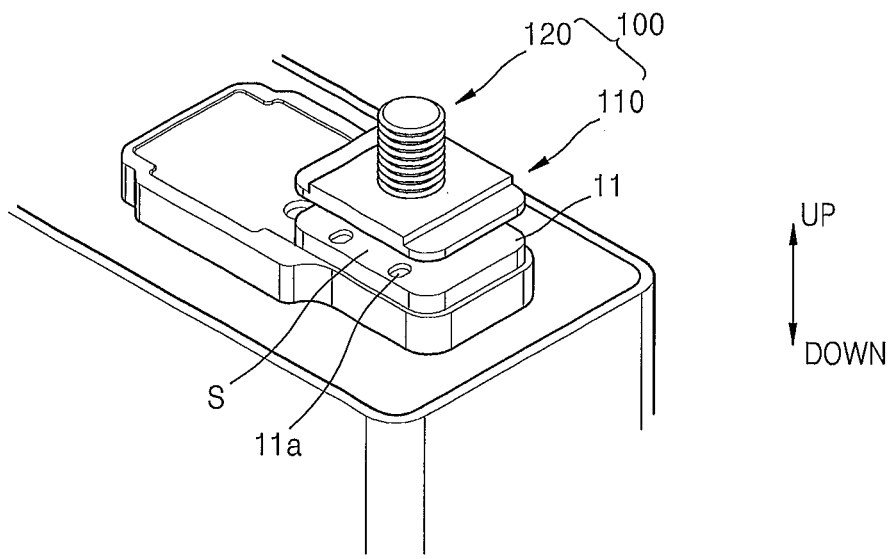
FIGS. 4 and 5 are exploded perspective views illustrating an electrode terminal illustrated in FIG. 3.
Figure 5:
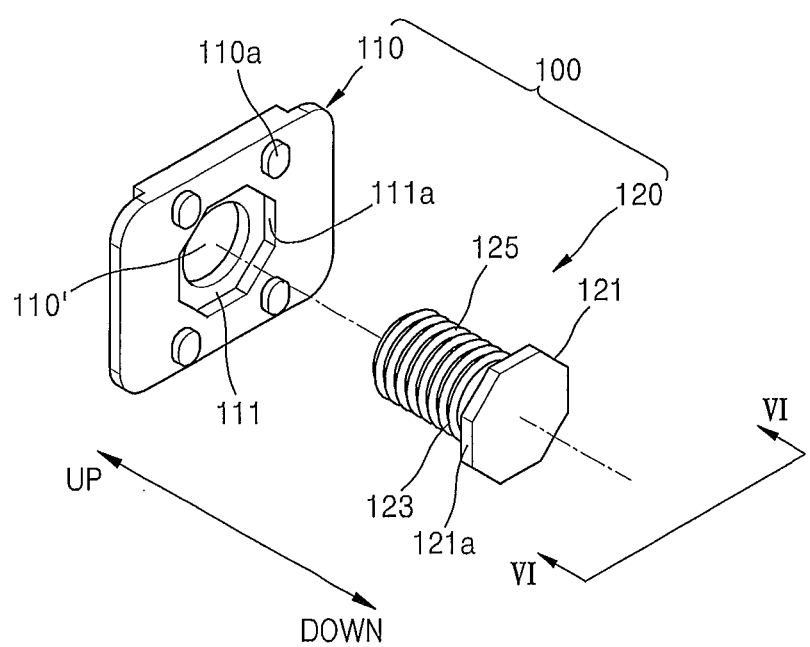
Figure 6:
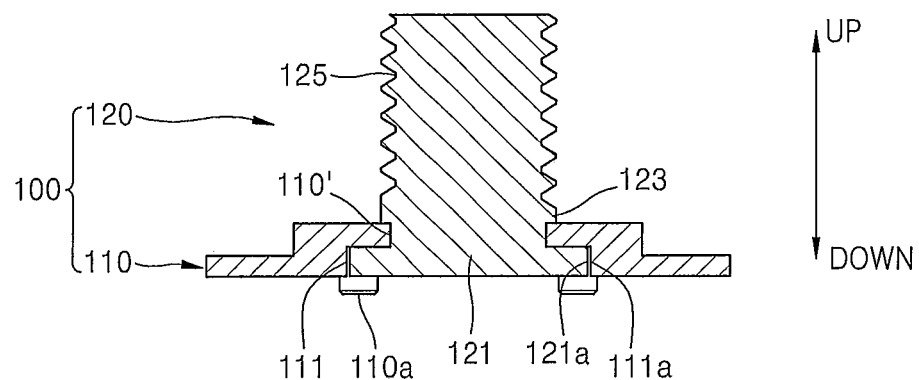
FIG. 6 is a cross-sectional view taken along line VI-VI of FIG. 5.

FIG. 3 is an exploded perspective view illustrating one of the battery cells 10 according to an exemplary embodiment. FIGS. 4 and 5 are exploded perspective views illustrating an electrode terminal 100 illustrated in FIG. 3. FIG. 6 is a cross-sectional view taken along line VI-VI of FIG. 5.

Referring to FIGS. 3 to 6, the electrode terminal 100 is disposed on a terminal coupling surface S of the battery cell 10. The electrode terminal 100 includes a plate member or base plate 110 coupled to the terminal coupling surface S, and a bolt 120 inserted into the plate member 110. The electrode terminal 100 may include a screw (not shown) instead of bolt 120. The screw may not include threads but include a head and a deformed portion (described below).

The plate member 110 is electrically connected to the battery cell 10 and is disposed on the terminal coupling surface S of the battery cell 10. For example, the terminal coupling surface S refers to a place to which the plate member 110 is coupled. The terminal coupling surface S may be electrically connected to a cell terminal 11 or may be a side of the cell terminal 11. The cell terminal 11 may be electrically connected to the electrode assembly (not shown) disposed in the battery cell 10 and may be exposed on an upper portion of the case 15 of the battery cell 10.

The plate member 110 may be coupled to the terminal coupling surface S of the battery cell 10, that is, the upper side of the cell terminal 11 of the battery cell 10, so as to electrically connect the plate member 110 to the battery cell 10.

Referring to FIG. 6, the bolt 120 may be inserted into and passing through the plate member 110 and may be long in one direction. For example, the bolt 120 includes catch jaws on both sides of the plate member 110 so as to fix the plate member 110. In addition, the bolt 120 may include a thread portion 125 exposed from the plate member 110. As described later, the plate member 110 and the bolt 120 may include different metallic materials.

The catch jaws of the bolt 120 may be disposed on both sides of the plate member 110 in the length direction of the bolt 120 so as to fix the plate member 110. For example, the bolt 120 includes a head 121 and a deformed portion 123 that form the catch jaws. In some embodiments, the portion of the bolt 120 excluding the head 121 is referred to as a body. In these embodiments, the body includes the thread portion 125 and the deformed portion 123. The thread portion 125 and the head 121 may be formed on an end portion and the other end portion of the bolt 120, and the deformed portion 123 may be formed between the thread portion 125 and the head 121.

A thread may be formed on the thread portion 125, and a washer (not shown) may be placed around the thread portion 125 with a ring terminal (not shown) of an input/output wire being disposed therebetween.

The head 121 may have a diameter larger than the diameter of the thread portion 125. The head 121 may have a polygonal shape. As described later, an outer circumferential surface 121a of the head 121 having a polygonal shape may be inserted into a recess or a first through-hole 111 of the plate member 110 and brought into contact with an inner circumferential surface 111a of the recess 111 so that the head 121 may have resistance to rotation. That is, as the outer circumferential surface 121a of the head 121 is brought into contact with the inner circumferential surface 111a of the recess 111, relative rotation between the bolt 120 and the plate member 110 may be restricted, and thus the bolt 120 may not be rotated relative to the plate member 110. For example, the head 121 and the deformed portion 123 of the bolt 120 provide a sufficient friction between the bolt 120 and the plate member 110 so as to minimize or prevent rotation of the bolt 120 relative to the plate member 110. It may be necessary to prevent arbitrary rotation of the bolt 120 when a washer (not shown) is coupled to the bolt 120. Mutually-facing surfaces of the bolt 120 and the plate member 110 may be designed to have a polygonal shape such that the bolt 120 may have resistance to rotation.

Referring to FIG. 5, the bolt 120 may be inserted into and passing through the plate member 110 in a direction from the lower side to the upper side of the plate member 110. For example, the thread portion 125 of the bolt 120 passes through a penetration hole 110' or second through-hole of the plate member 110 and may be exposed from the upper side of the plate member 110. The penetration hole 110' can be smaller than the recess 110. In addition, the head 121 of the bolt 120 may be caught in the recess 111 of the plate member 110. In this manner, the bolt 120 may be fixed.

As described later, in the coupling direction of the bolt 120, the plate member 110 may include the recess 111 having a relatively large diameter and the penetration hole 110' having a relatively small diameter. The thread portion 125 of the bolt 120 may pass through the penetration hole 110' of the plate member 110 and may be exposed from the upper side of the plate member 110. However, the head 121 of the bolt 120 may not pass through the penetration hole 110' of the plate member 110 but may contact a wall of the recess 111 so that the bolt 120 may be fixed and may not be separated from the plate member 110.

Referring to FIGS. 4 and 5, the plate member 110, through which the bolt 120 is inserted, may be coupled to the terminal coupling surface S of the battery cell 10. For example, the plate member 110 is assembled on the terminal coupling surface S of the battery cell 10. Furthermore, the plate member 110 may be coupled to the terminal coupling surface S of the battery cell 10, that is, the upper side of the cell terminal 11 of the battery cell 10. Moreover, the plate member 110 may be coupled to the cell terminal 11 and electrically connected to the cell terminal 11.

Assembling protrusions 110a may be formed on the plate member 110, and assembling recesses 11a may be formed in the terminal coupling surface S to receive the assembling protrusions 110a. The assembling protrusions 110a and the assembling recesses 11a are respectively formed on the plate member 110 and the terminal coupling surface S that face each other. Thus, the plate member 110 may be coupled to the terminal coupling surface S by inserting the assembling protrusions 110a into the assembling recesses 11a. For example, the assembling protrusions 110a are formed at four symmetric positions on the lower side of the plate member 110 facing the terminal coupling surface S. The assembling recesses 11a may be formed in the terminal coupling surface S at four positions corresponding to the assembling protrusions 110a.

The recess 111 having a relatively large diameter and the penetration hole 110' having a relatively small diameter are formed in the plate member 110. The recess 111 and the penetration hole 110' may be formed one after another in the coupling direction of the bolt 120. For example, the recess 111 and the penetration hole 110' are formed in a direction from the lower side to the upper side of the plate member 110. The recess 111 may be formed between the lower side of the plate member 110 and the penetration hole 110'.

When the bolt 120 is inserted upward into the plate member 110, the thread portion 125 of the bolt 120 passes through the penetration hole 110' of the plate member 110 and comes out to the upper side of the plate member 110. However, the head 121 of the bolt 120 does not pass through the penetration hole 110' but comes into contact with walls of the penetration hole 110' and the recess 111. The inner circumferential surface 111*a* of the recess 111 may have a polygonal shape matching the outer circumferential surface 121*a* of the head 121. The inner circumferential surface 111*a* of the recess 111 and the outer circumferential surface 121*a* of the head 121, which engage with each other, may have a polygonal shape such as a hexagonal shape, and thus arbitrary rotation of the bolt 120 may be suppressed by the head 121. That is, the bolt 120 may have resistance to arbitrary rotation.

The electrode terminal 100 includes the plate member 110 coupled to the terminal coupling surface S, and the bolt 120 inserted into the plate member 110. The plate member 110 is electrically connected to the cell terminal 11 to form a charge-discharge current path. To this end, the plate member 110 may include a metallic material having a high degree of electric conductivity such as aluminum. For example, a bus bar 20 (refer to FIG. 1) may be coupled to the plate member 110 to electrically connect the battery cell 10 to another battery cell 10. The bus bar 20 may also include aluminum. The plate member 110 and the bus bar 20 may include the same metallic material, and thus electric resistance between the plate member 110 and the bus bar 20 may be low.

The bolt 120 includes the thread portion 125, and a ring terminal (not shown) of an input/output wire or the bus bar 20 may be fixed to the thread portion 125 of the bolt 120. For example, a part such as a washer (not shown) is coupled to the bolt 120 with a ring terminal (not shown) of an input/output wire being disposed between the plate member 110 and the washer. The bolt 120 may have a sufficiently high degree of stiffness to provide sufficient coupling strength and avoid or minimize damage to the thread portion 125 during assembly. In some embodiments, the bolt 120 includes a high-strength metallic material having a higher degree of strength than the plate member 110. For example, the bolt 120 includes a material such as steel, nickel, copper, or stainless steel (SUS).

Since the electrode terminal 100 includes different metallic materials, the electric resistance of the charge-discharge current path may be reduced, and sufficient coupling strength may be guaranteed after an assembling process is performed for making electric connection. That is, the electrode terminal 100 is configured according to the functions of parts of the electrode terminal 100: the plate member 110 forming an electric path includes a metallic material having a high degree of electric conductivity, and the bolt 120 used for mechanical coupling includes a metallic material having a high degree of stiffness for providing sufficient coupling strength and preventing damage during an assembling process.

As described above, the plate member 110 and the bolt 120 of the electrode terminal 100 include different metallic materials, and thus a coupling structure between the plate member 110 and the bolt 120 is carefully selected. For example, welding between different metallic materials may not guarantee sufficient coupling strength. This will be further described later.

Referring to FIG. 6, the bolt 120 further includes the deformed portion 123. The deformed portion 123 may be disposed between the head 121 and the thread portion 125. After the bolt 120 is inserted into the plate member 110, the deformed portion 123 may be formed so as to fix the plate member 110. For example, the plate member 110 is disposed between the head 121 and the deformed portion 123 and is then fixed therebetween. The plate member 110 may be fixed between the head 121 and the deformed portion 123 functioning as catch jaws. The deformed portion 123 may have a diameter larger than the diameter of the penetration hole 110', and the deformed portion 123 and the head 121 may fix the plate member 110.

The deformed portion 123 of the bolt 120 may be formed after the bolt 120 is inserted into the plate member 110. For example, the deformed portion 123 of the bolt 120 may be formed when the thread portion 125 is formed. For example, the deformed portion 123 of the bolt 120 is formed together with the thread portion 125. For example, after the bolt 120 is inserted into the plate member 110, the thread portion 125 is formed when a thread is formed on the outer surface of the bolt 120 in a direction from the upper end of the bolt 120 toward the plate member 110. In this case, when the thread is completely formed to a position close to the plate member 110, that is, when the final turn of the thread closest to the plate member 110 is formed, a portion of the bolt 120 is pushed and deformed toward the plate member 110, thereby forming the deformed portion 123 in a protrusion shape. In this manner, the deformed portion 123 may be formed at a position close to the plate member 110, and thus the plate member 110 may be fixed between the deformed portion 123 and the head 121. The deformed portion 123 may be formed between the plate member 110 and the final turn of the thread of the thread portion 125 closest to the plate member 110.

After the bolt 120 is inserted into the plate member 110, the deformed portion 123 may be machined together with the thread portion 125. The deformed portion 123 and the thread portion 125 may be exposed from the plate member 110. This is because the deformed portion 123 and the thread portion 125 are both formed by machining a thread on an upper portion of the bolt 120 exposed from the plate member 110. The deformed portion 123 may not be formed on a portion of the bolt 120 covered with the plate member 110.

If the deformed portion 123 is not formed, the head 121 of the bolt 120 and the recess 111 of the plate member 110 may not physically interfere with each other, and thus arbitrary rotation of the bolt 120 may not be constrained. That is, the head 121 of the bolt 120 and the recess 111 of the plate member 110 are configured to interfere with each other at least partially. This structure makes it possible to prevent arbitrary rotation of the bolt 120. In some embodiments, the deformed portion 123 is formed on the bolt 120, and the plate member 110 is constrained between the deformed portion 123 and the head 121 of the bolt 120. For example, the deformed portion 123 and the head 121 are formed on both sides of the plate member 110 to constrain the position of the plate member 110. As described later, the plate member 110 may have a dimensional tolerance between the deformed portion 123 and the head 121 in the length direction of the bolt 120. The dimensional tolerance of the plate member 110 may be properly limited so as to allow for physical interference between the bolt 120 and the plate member 110, that is, physical interference between the head 121 of the bolt 120 and the recess 111 of the plate member 110. This will now be described.

Figure 7:
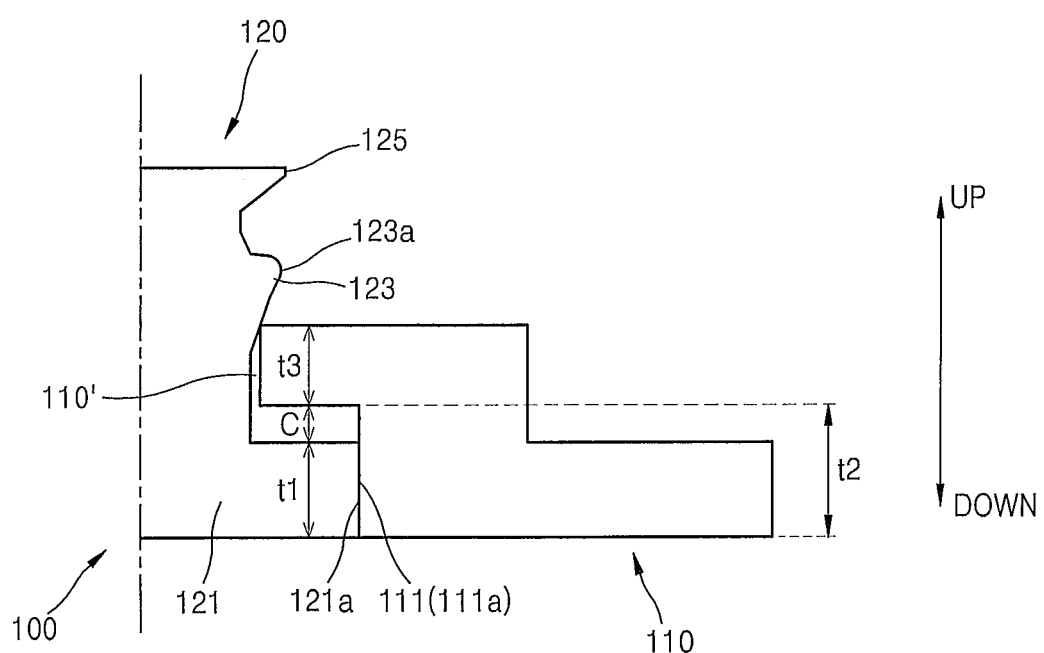
FIGS. 7 and 8 are views illustrating a design for constraining the rotation of a bolt.
Figure 8:
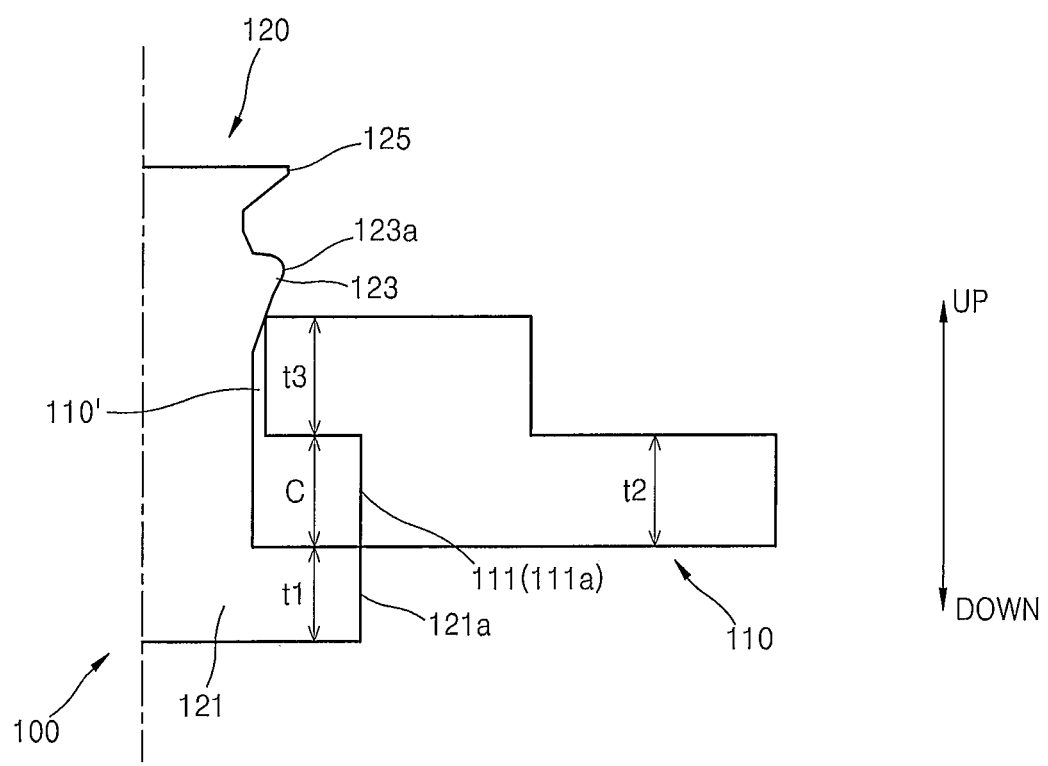

FIGS. 7 and 8 are views illustrating a design for constraining the rotation of the bolt 120.

As shown in FIGS. 7 and 8, some embodiments limit a dimensional tolerance C of the plate member 110 to some degree so as to limit movement of the plate member 110 between the deformed portion 123 and the head 121 of the bolt 120. For example, if the plate member 110 excessively moves between the deformed portion 123 and the head 121 of the bolt 120, the head 121 of the bolt 120 may depart from the recess 111 of the plate member 110. In this case, the head 121 may not physically interfere with the recess 111. As a result, the bolt 120 may arbitrarily rotate. That is, arbitrary rotation of the bolt 120 may not be prevented. Thus, it may be difficult to couple a bus bar 20 or a ring terminal (not shown) of an input/output wire to the bolt 120.

According to the inventive concept, the dimensional tolerance C of the plate member 110 may be specified as follows. Referring to FIGS. 7 and 8, if the following condition 1 is satisfied, the head 121 of the bolt 120 (specifically, the outer circumferential surface 121a of the head 121) may physically interfere with the recess 111 of the plate member 110 (specifically, the inner circumferential surface 111a of the recess 111) over the entire area of the head 121 in the vertical direction.

$$C + t1 \leq t2 \quad (1)$$

In this case, the head 121 of the bolt 120 is entirely placed in the recess 111 of the plate member 110.

Referring to FIG. 8, if the following condition 2 is satisfied, the head 121 of the bolt 120 (specifically, the outer circumferential surface 121a of the head 121) may physically interfere with the recess 111 of the plate member 110 (specifically, the inner circumferential surface 111a of the recess 111) over at least a portion of the head 121 in the vertical direction.

$$C \leq t2 \quad (2)$$

When C=t2, the head 121 of the bolt 120 starts to overlap the recess 111 of the plate member 110.

In the conditions 1 and 2, t1 refers to the thickness of the head 121 of the bolt 120. In addition, t2 refers to the depth of the recess 111 of the plate member 110. Since the conditions 1 and 2 are for guaranteeing the interference between the head 121 of the bolt 120 and the recess 111 of the plate member 110, the thickness t1 of the head 121 and the depth t2 of the recess 111 are specified by the conditions 1 and 2.

In the conditions 1 and 2, C refers to the dimensional tolerance of the plate member 110. The dimensional tolerance C of the plate member 110 may be understood as a distance within which the plate member 110 is movable between the deformed portion 123 and the head 121 of the bolt 120. The dimensional tolerance C of the plate member 110 may correspond to a value obtained by subtracting the thickness t3 of the plate member 110 disposed between the deformed portion 123 and the head 121 of the bolt 120 from the distance between the deformed portion 123 and the head 121 of the bolt 120. The distance between the deformed portion 123 and the head 121 of the bolt 120 may be the upper limit of the dimensional tolerance C of the plate member 110, and the dimensional tolerance C of the plate member 110 may correspond to a value obtained by subtracting the thickness t3 of the plate member 110 from the upper limit. The distance between the deformed portion 123 and the head 121 refers to a distance measured from the head 121 to a point of the deformed portion 123 at which the movement of the plate member 110 is substantially restricted by the shape of the deformed portion 123. As shown in FIG. 7, a region of the deformed portion 123 that does not sufficiently protrude to restrict the movement of the plate member 110 may not be considered, and the distance between the deformed portion 123 and the head 121 may be measured from the head 121 to the remaining region of the deformed portion 123 that sufficiently protrudes to restrict the movement of the plate member 110. Then, this distance may be used to calculate the dimensional tolerance C.

Referring to FIG. 7, when a thread is formed downward around the bolt 120 to form the thread portion 125, the metallic material of the bolt 120 may be pushed downward toward the plate member 110 as the final turn of the thread is formed, and thus the deformed portion 123 may be formed in a protrusion shape. In this case, due to the deformation behavior of the metallic material, the deformed portion 123 may be formed as a protrusion having a peak 123a relatively distant from the plate member 110 and relatively close to the thread portion 125.

According to at least one of the disclosed embodiments, the electrode terminal 100 forming a charge-discharge current path and providing an access point to the charge-discharge current path includes different metallic materials, thereby lowering the electric resistance of the charge-discharge current path and guaranteeing a sufficient degree of coupling strength during an assembling process for making electric connection. Due to the coupling structure between the different metallic materials of the electrode terminal 100, the coupling between the different metallic materials may be maintained securely and stably, and thus proper resistance to rotation may be provided during mechanical assembling processes.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A battery pack comprising:
    a battery cell; and
    an electrode terminal comprising a plate member electrically connected to the battery cell, and a bolt passing through the plate member,
    wherein the bolt comprises:
    catch jaws arranged on opposing sides of the plate member in a length direction of the bolt; and
    a thread portion exposed from the plate member,
    wherein the plate member and the bolt comprise different metallic materials, wherein the plate member is formed in a unitary single-piece and has first and second through-holes having different widths and aligned with each other, wherein the first and second through-holes of the unitary single-piece plate member are configured to pass different portions of the bolt therethrough, wherein the bolt comprises a head and a body extending from the head, wherein the body includes the thread portion and a deformed portion formed between the thread portion and the head, wherein the deformed portion is deformed with respect to a remaining portion of the body and spaced apart and shaped differently from the thread portion, wherein the unitary single-piece plate member directly contacts both the head and a side surface of the deformed portion without contacting the thread portion, and wherein a largest width of the thread portion is greater than that of the second through-hole of the plate member and less than that of the first through-hole of the plate member.

2. The battery pack of claim 1, wherein the head and the deformed portion of the body respectively form the catch jaws on the opposing sides of the plate member.

3. The battery pack of claim 2, wherein the thread portion is disposed in a portion of the body other than the deformed portion, and wherein the deformed portion is exposed from the plate member together with the thread portion.

4. The battery pack of claim 3, wherein the thread portion is inserted into the second through-hole and wherein the first through-hole receives an outer circumferential surface of the head.

5. The battery pack of claim 1, wherein the inner circumferential surface of the first through-hole and the outer circumferential surface of the head physically interfere with each other at least partially.

6. The battery pack of claim 5, wherein the inner circumferential surface of the first through-hole and the outer circumferential surface of the head have a polygonal shape.

7. The battery pack of claim 5, wherein the first through-hole and the plate member disposed between the catch jaws satisfy C≤t2, where C represents a dimensional tolerance of the plate member and t2 represents the depth of the first through-hole.

8. The battery pack of claim 5, wherein the head, the first through-hole, and the plate member disposed between the catch jaws satisfy C+t1≤t2, where C represents a dimensional tolerance of the plate member, t1 represents the thickness of the head, and t2 represents the depth of the first through-hole.

9. The battery pack of claim 8, wherein the dimensional tolerance C, the thickness t1 of the head, and the depth t2 of the first through-hole are defined in the length direction of the bolt.

10. The battery pack of claim 2, wherein the deformed portion includes a protrusion which is formed as the metallic material of the bolt.

11. The battery pack of claim 10, wherein the deformed portion is disposed between the plate member and a turn of a thread of the thread portion closest to the plate member.

12. The battery pack of claim 11, wherein the thread portion is not formed in a region of the bolt covered with the plate member.

13. The battery pack of claim 10, wherein the deformed portion has a protrusion shape having a peak relatively distant from the plate member and relatively close to the thread portion.

14. The battery pack of claim 1, wherein the metallic material of the bolt is harder than the metallic material of the plate member.

15. The battery pack of claim 14, wherein the plate member comprises aluminum, and wherein the bolt comprises steel, copper, nickel, stainless steel (SUS), or an alloy thereof.

16. The battery pack of claim 1, wherein assembling protrusions and assembling recesses are respectively formed on mutually-facing surfaces of the plate member and the battery cell such that the assembling protrusions are inserted into the assembling recesses.

17. The battery pack of claim 1, wherein the second through-hole of the unitary single-piece plate member has an inner circumferential surface facing the deformed portion, and wherein at least a portion of the inner circumferential surface of the second through-hole is in direct physical contact with an outer circumferential surface of the deformed portion.

18. A battery pack comprising:
a battery cell; and
an electrode terminal comprising i) a base plate electrically connected to the battery cell having a first through-hole and a second through-hole aligned with and smaller than the first through-hole, the base plate formed in a unitary single-piece and ii) a screw at least partially passing through the first and second through-holes of the base plate, wherein the screw comprises a head and a body, wherein the body includes a deformed portion deformed with respect to a remaining portion of the body, wherein the head of the screw is inserted into the first through-hole of the base plate, wherein the deformed portion of the screw is inserted into the second through-hole of the base plate, and wherein the remaining portion of the body passes through the first and second through-holes and are exposed from the first and second through-holes of the base plate,
wherein the body further includes a thread portion, wherein the deformed portion is formed between the thread portion and the head, wherein the deformed portion is spaced apart and shaped differently from the thread portion, wherein the unitary single-piece base plate directly contacts both the head and a side surface of the deformed portion of the body without contacting the thread portion of the body, and
wherein a largest width of the thread portion is greater than that of the second through-hole of the base plate and less than that of the first through-hole of the base plate.

19. The battery pack of claim 18, wherein at least part of the deformed portion contacts an inner wall of the second through-hole of the base plate.

20. The battery pack of claim 18, wherein the base plate and the screw are formed of different metallic materials.

21. The battery pack of claim 18, wherein the head and the deformed portion of the screw provide a sufficient friction between the screw and the base plate so as to minimize or prevent rotation of the screw relative to the base plate.

\* \* \* \* \*